United States Patent [19]

Takayama et al.

[11] Patent Number: 5,516,276
[45] Date of Patent: May 14, 1996

[54] INJECTION MOLDING APPARATUS FOR MOLDING A DISC HAVING A REPLACEABLE DIE

[75] Inventors: Kazutoshi Takayama; Makoto Nakazawa; Toshiyuki Kanai; Kazuki Miyairi; Shuji Aiba; Minoru Yamazaki, all of Nagano, Japan

[73] Assignee: Nissei Plastics Industrial Co., Ltd., Japan

[21] Appl. No.: 315,119

[22] Filed: Sep. 29, 1994

Related U.S. Application Data

[63] Continuation-in-part of Ser. No. 163,402, Dec. 7, 1993, abandoned, which is a continuation of Ser. No. 865,198, Apr. 8, 1992, abandoned.

[51] Int. Cl.[6] .................................................. B29C 45/64
[52] U.S. Cl. ........................... 425/574; 264/106; 264/107; 425/575; 425/589; 425/810
[58] Field of Search ..................... 425/185, 190, 425/186, 192 R, 574, 575, 589, 595, 810; 264/106, 107

[56] References Cited

U.S. PATENT DOCUMENTS

| 4,473,346 | 9/1984 | Hehl | 425/186 |
|---|---|---|---|
| 4,544,340 | 10/1985 | Hehl | 425/190 |
| 4,555,228 | 11/1985 | Nishiike et al. | 425/190 |
| 5,096,404 | 3/1992 | Janos et al. | 425/190 |
| 5,114,329 | 5/1992 | Nakamura et al. | 425/190 |

FOREIGN PATENT DOCUMENTS 3-79321  4/1991  Japan.

*Primary Examiner*—Tim Heitbrink
*Attorney, Agent, or Firm*—Ostrolenk, Faber, Gerb & Soffen

[57] ABSTRACT

A die assembly for molding a disc such as a compact disc, a video disc or the like by employing an injection molding process. The die assembly comprises a stationary die half including as essential components a stationary platen, a base die half, and an insert die half received on the stationary platen, and a movable die half. The insert die half includes a first insert for fixing the insert die half on the stationary platen, and a first mirror surface board removably received in a cavity of the first insert. The insert die half can be easily installed and removed into/from an installation space defined by a pair of retaining members and a die receiving member and when installed, it can be certainly and easily fixed by a pair of retaining members.

6 Claims, 6 Drawing Sheets

INJECTION MOLDING APPARATUS FOR MOLDING A DISC HAVING A REPLACEABLE DIE

CROSS-REFERENCE TO RELATED APPLICATIONS

This is a continuation-in-part of application Ser. No. 08/163,402 filed on Dec. 7, 1993, abandoned, which is a continuation of application Ser. No. 07/865,198 filed On Apr. 8, 1992, abandoned.

BACKGROUND OF THE INVENTION

1. Field of the Invention

The present invention relates to a die assembly for molding a disc. More particularly, the present invention relates to a die assembly employable when a disc such as a compact disc, a video disc, CD-ROM, MD or the like is molded using a synthetic resin by employing an injection molding apparatus.

2. Background Art

A conventional die assembly for molding a disc using a synthetic resin by employing an injection molding process or an injection/compression molding process is generally constructed such that a mirror surface-finished die board is firmly received in a movable die half. A stamper is placed on the mirror surface die board and this stamper is then immovably held on the movable die half with the aid of an inner ring and outer ring fitted thereto by tightening bolts.

With the conventional die assembly constructed in the above-described manner, when it is required that the present die assembly be replaced with another one, a molding operation is first interrupted, and thereafter, die replacement is achieved while the stationary die half is held still on a molding machine. However, since the die replacing operation must be performed within the narrow space between the opened movable die half and the stationary die half on the molding machine, die replacement is accomplished only at a very low operational efficiency. In addition, there often arises a malfunction so that the expensive mirror surface board is readily damaged due to the limited space therebetween during the die replacing operation. Another malfunction is that foreign matter such as dust or the like is liable to enter the space between the stamper and the mirror surface board, resulting in double reflection, local warpage, projection-shaped flaw or the like being undesirably caused on a molded disc product molded with the conventional die assembly.

In view of the malfunctions as mentioned above, a proposal has been made with respect to a die assembly of the aforementioned type as disclosed in an official gazette of Japanese Unexamined Patent Publication No. 63-303713. According to this prior invention, the die assembly is constructed such that a spacer, a stamper, a mirror surface board, an inner ring and an outer ring are fabricated in the form of an unit component. This enables a die assembly operation to be performed outside of a molding machine without any necessity for replacing the stamper with another one while the die assembly is held still on the molding machine.

With respect to the die assembly constructed according to this aforementioned prior invention, however, since the spacer, the stamper and the mirror surface board are assembled together with the aid of the inner ring and a fixing member fitted to the foremost end part of the inner ring to form a single integrated structure which is then turned together with the inner ring so as to allow the integrated structure to be mounted on the movable die half, there exists a problem that the whole integrated structure must be disassembled after removal from the movable die half and another integrated structure must be rebuilt in place of the former one each time the stamper is replaced with another one.

In addition, for fixing a unit on the movable die half, fixing means disposed at the foremost end of an inner ring must manually be fitted to another fixing means for the whole die assembly by rotating the foregoing unit. The position where the fixing means for the whole die is disposed on the movable die half is inevitably limited to a position in the vicinity of the position where an ejector mechanism required for taking a molded disc product out of the die assembly and a gate cutting mechanism are arranged, and moreover, the fixing means for the whole die must be arranged without any occurrence of interference with the mechanisms as mentioned above, resulting in the movable die half becoming unavoidably complicated in structure.

Since the die unit is inserted from the parting plane side of the movable die half when the present die assembly is replaced with another one, there exists a problem that elaborate care must be taken so that the unit does not collide with each of the aforementioned mechanisms.

Further, a die temperature is one of the significant factors associated with an operation for molding a disc. To assure that double refraction is minimized over the molded disc product and a stamper surface has excellent transferability and dimensional accuracy, the die temperature must be controlled in such a manner that the whole surface of a cavity is kept at a comparatively high temperature which in turn is uniformly and stably maintained for a long period of time.

However, according to the prior invention as mentioned above, the unit can not be equipped with temperature regulating means. Provided that temperature regulating circuits to be incorporated in the die assembly are arranged in a region in the vicinity of a unit fitting surface, they can not practically be arranged at a position near to the surface of a cavity for which temperature regulation is important. For this reason, it has been hitherto considered practically difficult to uniformly and stably control the die temperature at a high level over the whole surface of the die assembly from a remote location. If the foregoing controlling operation is forced to be performed, there probably appears another problem that a temperature regulating unit operable at a high flow rate under a high intensity of pressure is required, resulting in the die assembly being fabricated at an expensive cost.

SUMMARY OF THE INVENTION

The present invention has been made with the foregoing background in mind.

An object of the present invention is to provide a die assembly for molding a disc using a synthetic resin by employing an injection molding process wherein die replacement can be achieved at a location outside of a molding machine merely by replacing the present mirror surface board or the present assembly of mirror surface board and stamper with another one.

Another object of the present invention is to provide a die assembly for molding a disc using a synthetic resin by employing an injection molding process wherein temperature regulating circuits can be arranged in the region near the mirror surface board.

According to the present invention, there is provided a die assembly for molding a disc wherein die replacement can be achieved at a location away from the die assembly, the die assembly comprising a stationary die half having a stationary platen; a base die half mounted on the stationary platen forming an installation space in the center thereof; a pair of retaining members comprising fixing members that extend longitudinally in a transverse direction with respect to the stationary platen, spring members, and wedge members, said retaining members being inserted into a recess between the stationary platen and the base die half; a die receiving member that extends longitudinally in a vertical direction thereof and is affixed vertically at one side of the stationary platen; and an insert die half comprising (i) a first insert removably retained by said fixing members, said first insert having a cavity formed therein and a stepped portion; and (ii) a first mirror surface board removably received in said cavity of said first insert, said first mirror surface board including a stamper placed on a surface of said first mirror surface board; an inner ring fitted through said first mirror surface board and an outer ring fitted onto said first mirror surface board; said stamper being immovably retained by said inner ring and said outer ring, and a rear surface of said outer ring being fitted onto said stepped portion of said first insert, wherein said insert die half can be slidably installed into and removed from said installation space defined inside the stationary platen by said retaining members and said die receiving member in a transverse direction relative to said stationary platen such that replacement of said first mirror surface board and said stamper can be achieved at a location spaced away from the die assembly, said insert die half is fixed by said fixing members pushed by the wedge members inserted between the fixing members and the base die half while said fixing members compress the spring members toward the stationary platen; and a movable die half having: a movable base that forms a main body of said movable die half, said movable base having a recessed portion; and a second insert die half comprising (i) a second insert fixedly received into said recessed portion of said movable base; and (ii) a second mirror surface board received on said second insert so as to correspond to said first mirror surface board on said first insert.

In addition, according to the present invention, there is provided a die assembly for molding a disc wherein die replacement can be achieved at a location away from the die assembly, the die assembly comprising: a stationary die half having: a stationary platen; a pair of retaining members comprising fixing members that extend longitudinally in a transverse direction with respect to the stationary platen, and a rectangular clamp member engaged with a clamp screw that can be turned from outside; a die receiving member that extends longitudinally in a vertical direction thereof and is affixed vertically at one side of the stationary platen, whereby an installation space is defined inside the stationary platen by said retaining members and said die receiving member; and an insert die half comprising (i) a first insert removably retained by said fixing members, said first insert having a cavity formed therein and a stepped portion; and (ii) a first mirror surface board removably received in said cavity of said first insert, said first mirror surface board including a stamper placed on a surface of said first mirror surface board; an inner ring fitted through said first mirror surface board and an outer ring fitted onto said first mirror surface board; said stamper being immovably retained by said inner ring and said outer ring, and a rear surface of said outer ring being fitted onto said stepped portion of said first insert, wherein said insert die half can be slidably installed into and removed from said installation space in a transverse direction relative to said stationary platen such that replacement of said first mirror surface board and said stamper can be achieved at a location spaced away from the die assembly, said fixing members including block shaped bases integrally formed at the rear side of both ends of a laterally long plate, the inside of the bases being formed as a stepped portion for settling the first insert of the insert die half, the inside of the long plate in the space formed between both the bases being formed in a similar stepped portion to the above stepped portion, the rectangular clamp member being provided closer to the inside of the long plate, and said insert die half is fixed to the stationary platen by inserting said insert die half guided by said upper and lower fixing members into a space between the stepped portions of the fixing members and the clamp member and the surface of the stationary platen, and by extension of the clamp member toward the stationary platen side by turning of the clamp screw; and a movable die half having: a movable base that forms a main body of said movable die half, said movable base having a recessed portion; and a second insert die half comprising (i) a second insert fixedly received into said recessed portion of said movable base; and (ii) a second mirror surface board received on said second insert so as to correspond to said first mirror surface board on said first insert.

To assure that the die temperature is uniformly and stably controlled while maintaining a predetermined temperature each of the insert die half on the stationary die half side and the insert die half on the movable die half side include temperature regulating circuits.

It is recommended that the inner ring be attached to or detached from the mirror surface board by actuating a worm gear mechanism, while the outer ring be attached to or detached from the mirror surface board by tightening or loosening bolts.

In addition, to assure that a molded disc product can easily be separated away from the stationary die half side after completion of each molding operation, an air passage is formed between the guide member and the inner ring while extending to one side of the insert die half on the stationary die half side.

Other objects, features and advantages of the present invention will readily become apparent from reading of the following description which has been made in conjunction with the accompanying drawings.

BRIEF DESCRIPTION OF TEE DRAWINGS

The present invention is illustrated in the following drawings in which.

DETAILED DESCRIPTION OF THE PREFERRED EMBODIMENTS

Figure 1:
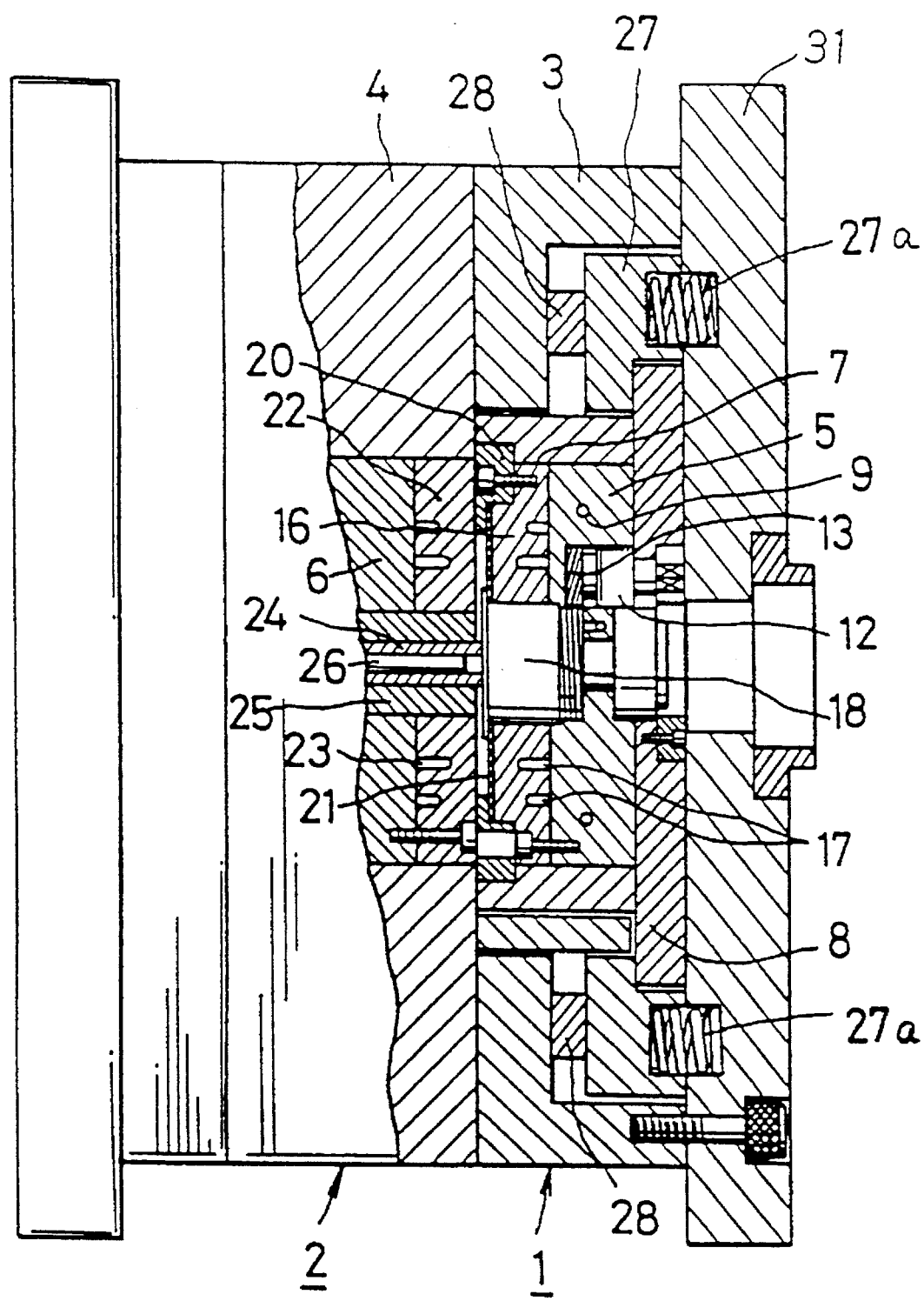
FIG. 1 is a fragmentary sectional view of a die assembly for molding a disc in accordance with an embodiment of the present invention.

Now, the present invention will be described in detail hereinafter with reference to the accompanying drawings which illustrate a preferred embodiment of the present invention.

A die assembly in accordance with the embodiments of the present invention is concerned with a case where a stamper is fixedly secured to a stationary platen. Specifically, the die assembly is constructed of a stationary die half 1 and a movable die half 2. The stationary die half 1 comprises a base die half 3 and an insert die half 5 received in the central region of the base die half 3 on a stationary platen 31, while the movable die half 2 comprises a base die half 4 and an insert die half 6 received in the central region of the base die half 4.

Figure 2:
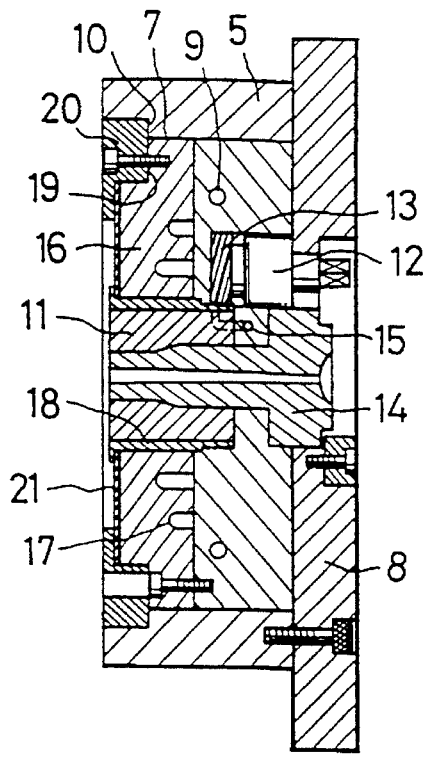
FIG. 2 is a vertical sectional view of an insert die half on the stationary platen side.
Figure 3:
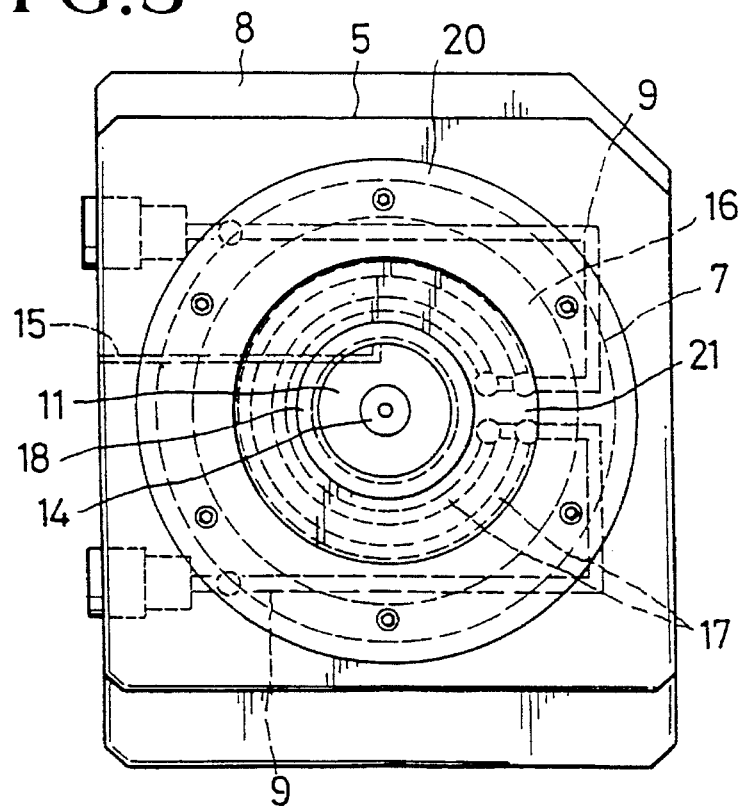
FIG. 3 is a plan view of the insert die half shown in FIG. 2.
Figure 4:
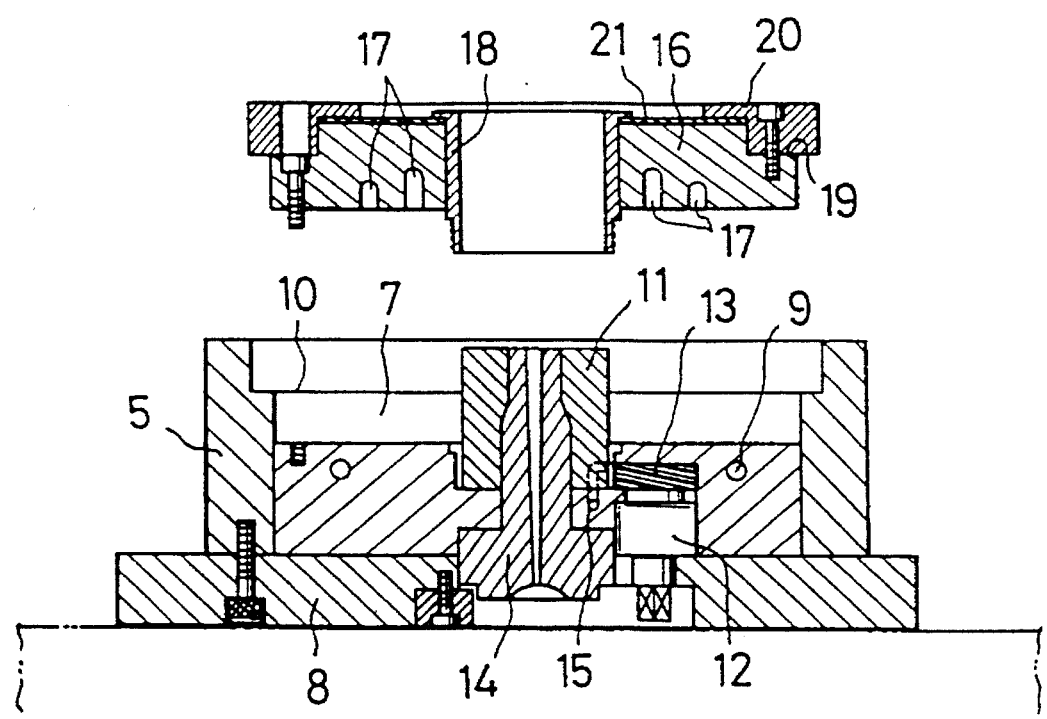
FIG. 4 is a vertical sectional view of the die assembly, particularly illustrating the die assembly in the disassembled state after a mirror surface board is separated from a stationary platen.

As shown in FIG. 2 and FIG. 4, the insert die half 5 on the stationary platen side is constructed so that a working die surface for molding a front surface of a molded disc product is formed on the insert die half 5 received in a circular cavity 7, and a fixing plate 8 is immovably secured to the rear surface of the insert die half 5. In addition, as shown in FIG. 3, temperature regulating circuits 9 are formed in the insert die half 5 while extending to the cavity 7 from the left-hand side of the insert die half 5 as seen in the drawing.

A stepped portion 10 is formed around the inner circumferential surface of the cavity 7 on the opening side of the same, and a cylindrical short guide member 11 is located slightly inside the front surface of the insert die half 5. The rear end of the guide member 11 is embedded in the insert die half 5, and a worm gear 13 is inserted into the insert die half 5 from the rear side of the fixing plate 8 together with a bearing 12. As is apparent from FIG. 2, the worm gear 13 is spaced slightly away from the embedded part of the guide member 11 with a predetermined gap therebetween.

A sprue bush 14 is inserted through the guide member 11, and an air passage 15 is formed adjacent to the sprue bush 14 while extending from the outer surface of the guide member 11 to the left-hand side of the insert die half 5 so as to enable a molded disc product to be easily separated away from the insert die half 5 after completion of each molding operation.

In the drawings, reference numeral 16 designates a circular mirror surface board which has a mirror surface-finished die surface formed thereon. The mirror surface board 16 includes temperature regulating circuits 17 to be connected to the temperature regulating circuits 9 in the insert die half 5. An inner ring 18 is inserted through the central part of the mirror surface board 16 so that it is fitted onto the guide member 11. A plurality of spirally extending gear teeth are formed around the outer surface of the inner ring 18 to mesh with the worm gear 13. In addition, an outer ring 20 is fitted to a stepped portion 19 of the mirror surface board 16 so that an assembly of the mirror board 16 and the outer ring 20 is snugly received in the stepped portion 10 of the insert die half 5.

Reference numeral 21 designates a stamper. The inner peripheral part of the stamper 21 is retained by a flange portion of the inner ring 18 and the outer peripheral part is retained by a flange portion of the outer ring 20, whereby the stamper 21 is immovably placed on the die surface of the mirror surface board 16 while coming in close contact with the same.

In FIG. 1, reference numeral 22 designates a mirror surface board on the movable base die half 2. The mirror surface board 22 includes temperature regulating circuits 23 in the central region thereof. As shown in FIG. 1, the mirror surface board 22 is fixedly secured to the insert die half 6 by tightening bolts.

Reference numeral 24 designates a punch. The punch 24 is inserted through a sleeve 25 received in the central part of the insert die half 6. As is apparent from the drawing, the punch 24 is located opposite to the sprue bush 14 on the stationary die half 1 side. Reference numeral 26 designates an ejector pin.

Figure 5:
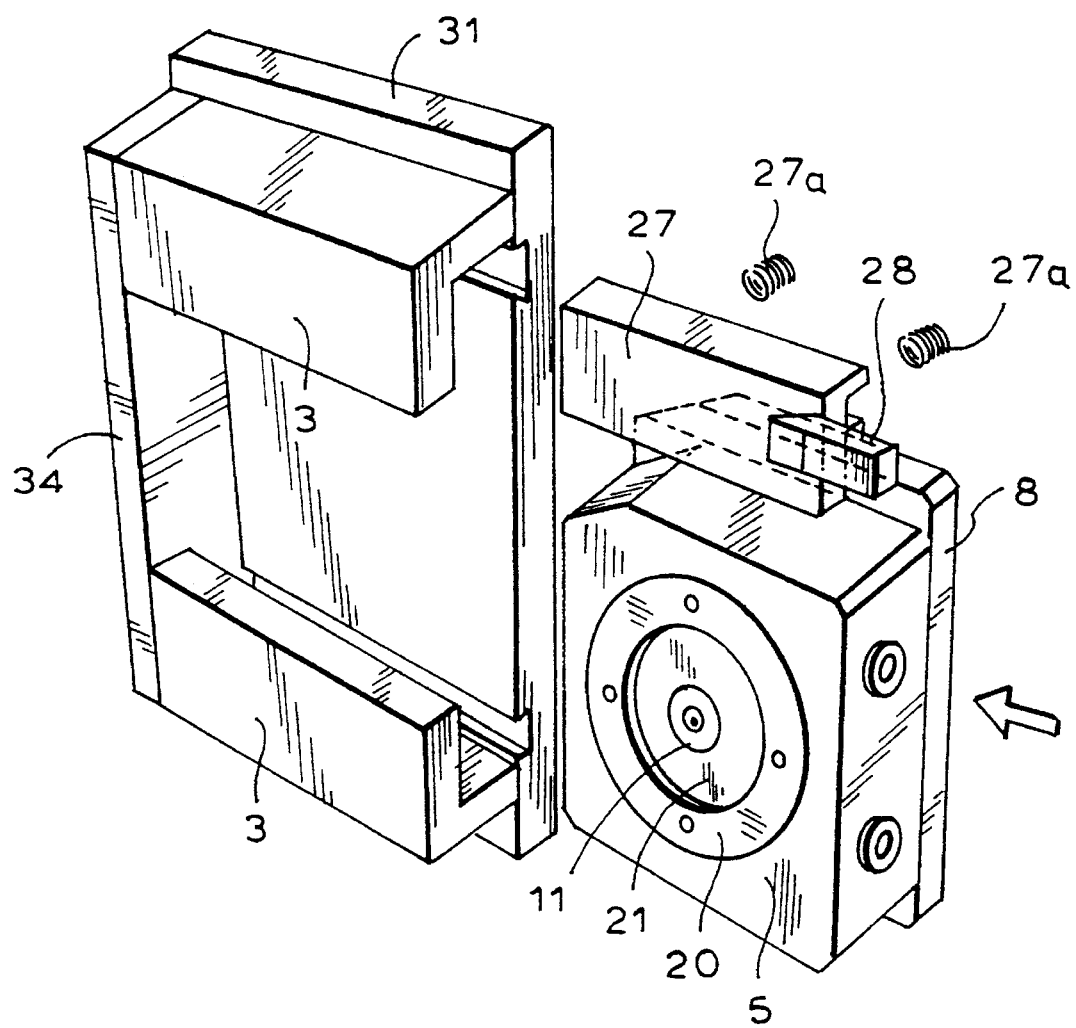
FIG. 5 is a perspective view illustrating the insertion of the insert die half into the stationary platen.

As shown in FIG. 1 and FIG. 5, reference numeral 27 designates fixing members for fixing the insert die half 5. The fixing members 27 are long in a transverse direction with respect to the stationary platen 31 and are movably accommodated in spaces formed in the upper part and lower part between the base die half 3 and the stationary platen 31. The fixing members 27 are urged inwardly by spring members 27a, and inner ends of the fixing members 27 are stepped to be engaged with the end portion of the fixing plate 8 of the insert die half 5.

Reference numeral 28 is a wedge member. After inserting the fixing plate 8 of the insert die half 5 between the upper and lower fixing members 27, 27 and the stationary platen 31, the wedge members 28 are pushed in between the fixing members 27 and the base die half 3 while compressing the spring members 27a, so that the stepped portions at the inner end of the fixing members 27 are pressed onto the ends of the fixing plate 8, and the insert die half 5 is fixed to the stationary platen 31. In FIG. 5, it is illustrated that the insert die half 5 is in front of the inlet of the stationary die half 1 composed of the base die half 3 and the stationary platen 31 (the lower fixing member 27 and the lower spring members 27a are omitted in this figure). A die receiving member 34 that extends longitudinally in a vertical direction thereof is affixed to receive the insert die half 5 on the stationary platen 31.

While the die assembly is kept in the closed state, the insert die half 5 comes in contact with the insert die half 6 received in the movable base die half 4 together with the outer ring 20 so that a molding cavity is formed between the stationary mirror surface board 16 and the movable mirror surface board 22 with the stamper 21 held on the stationary die half 1 side while it is circumferentially surrounded by the outer ring 20.

When it is required that the stamper 21 be replaced with another one, the wedge members 28 are first removed from the stationary base die half 3, and thereafter, the insert die half 5 is drawn sideward out of the stationary base die half 3. After the insert die half 5 is removed and placed on a predetermined location, the outer ring 20 is removed from the insert die half 5. Subsequently, the inner ring 18 is moved outside of the insert die half 5 by rotating the worm gear 13 from the rear side of the insert die half 5, whereby the stamper 21 is released from its retained state. At this time, since the stamper 21 is entirely free from the retaining force for retaining it on the die surface of the mirror surface board 16, it can be removed from the mirror surface board 16.

Next, a new stamper is placed on the mirror surface board 16, and the inner ring 18 is then inserted into the central part of the insert die half 5 until the gear teeth on the inner ring 18 mesh with the worm gear 13. As the worm gear 13 is rotated, the inner ring 18 is taken into the interior of the insert die half 5 so that the new stamper 21 is retained by the flange portion of the inner ring 18. In addition, the outer ring 20 is fitted onto the insert die half 5, whereby the new stamper 21 is immovably held on the die surface of the insert die half 5 by the flange portion of the outer ring 20. On completion of the operation for replacing the stamper 21 with a new one, the insert die half 5 is taken to a molding machine (not shown) to be fixedly mounted in the central region of the stationary base die half 3.

On the other hand, when it is required that the die surface of the mirror surface board 16 be cleaned, first, the mirror surface board 16 is separated from the insert die half 5 as shown in FIG. 4. After completion of a cleaning operation, the stamper 21 is placed on the mirror surface board 16 and is then firmly retained on the die surface of the mirror surface board 16 by the flange portion of the outer ring 20. Subsequently, the mirror surface board 16 is received in the cavity 7 of the insert die half 5 so that the stamper 21 is finally immovably held by the flange portion of the inner ring 18.

Since the insert die half 5 includes temperature regulating circuits 9, a temperature regulating operation can be performed not only during each molding operation but also at the time when the molding die is used as a standby die. Consequently, manhours hitherto required for regulating the temperature of a molding die to a predetermined temperature after the insert die half 5 is mounted on the stationary base die half 3 can be eliminated.

After completion of a molding operation, a molded disc product can easily be separated away from the stamper 21 by blowing in air via the air passage 15 formed between the guide member 11 and the inner ring 18.

Figure 6:
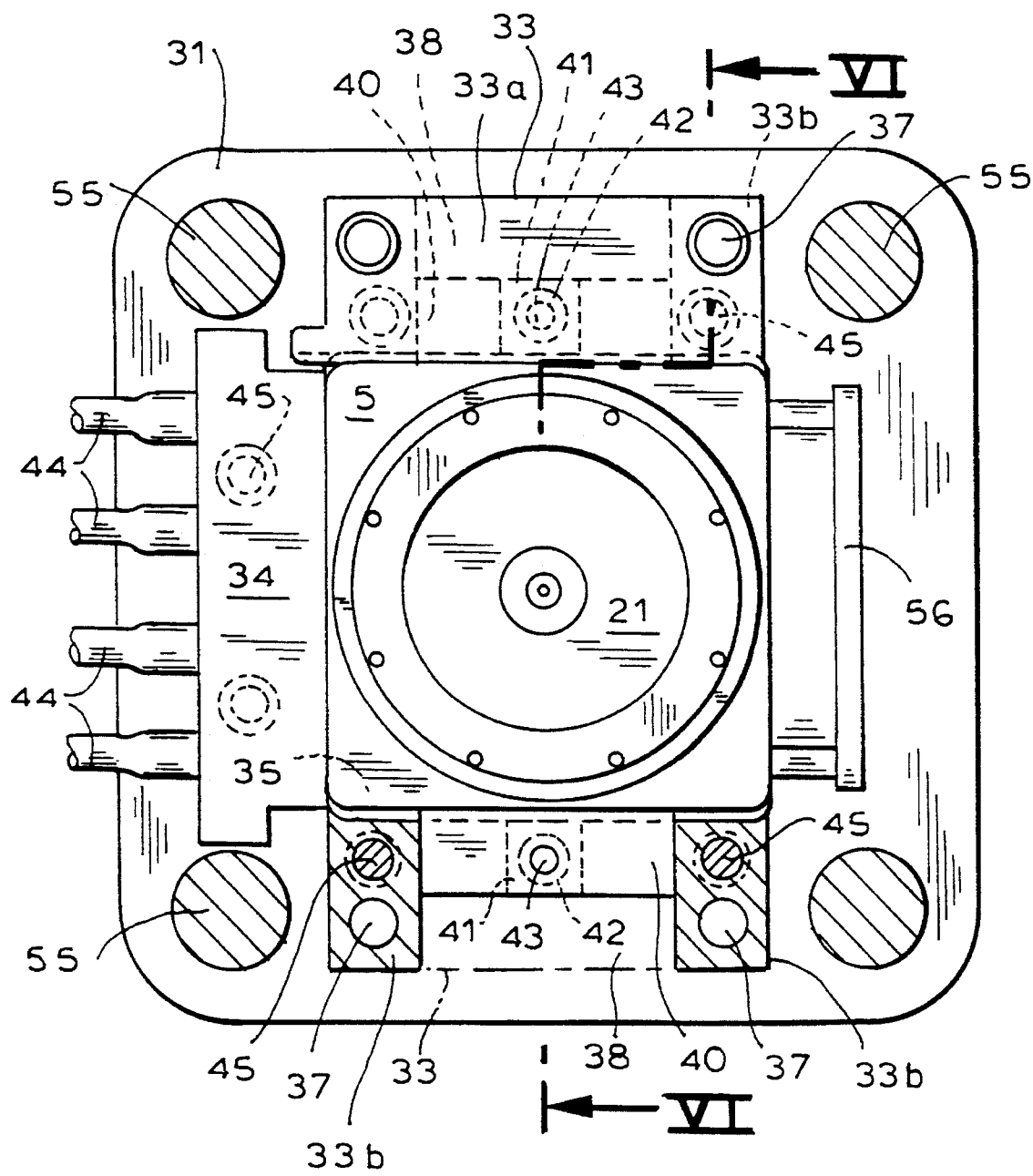
FIG. 6 is a partial sectional front view of a stationary platen side in another embodiment of the present invention.
Figure 7:
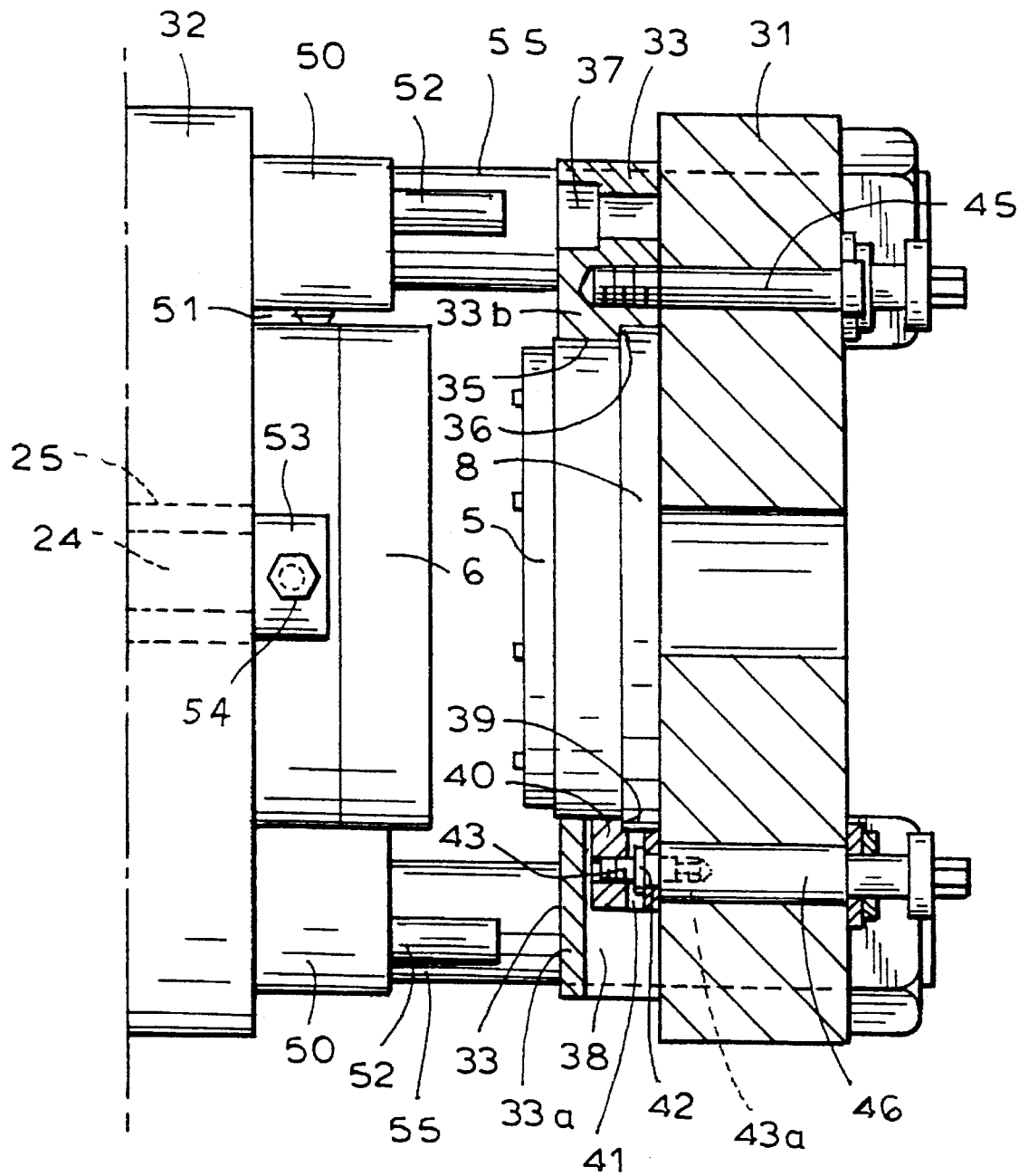
FIG. 7 is a side view when the die is open, with the stationary platen side shown along line VI—VI in FIG. 6.

FIG. 6 and FIG. 7 show another embodiment of the present invention. To mount the insert die half 5 to be opposed to the inside of the stationary platen 31, an installation space 35 for the insert die half 5 is provided. The installation space 35, opened at one side, is defined on the inside of the stationary platen 31 by a pair of fixing members 33, 33. The fixing members 33 that extend longitudinally along the inside of the stationary platen 31 at lateral positions thereof and serve also as guides, are affixed parallel to each other at relative portions above and below the inside of the stationary platen 31. A die receiving member 34 that extends longitudinally in a vertical direction thereof is affixed vertically to the inside of the stationary platen 31 at one side of the fixing members 33.

The fixing members 33 have almost the same function as the fixing members 27. However, the fixing members 33 include block shaped bases 33b that are integrally formed at the rear side of both ends of laterally long plates 33a, and the inside of the bases 33b are formed as stepped portions 36 in which the edges of the fixing plate 8 of the insert die half 5 may settle. At both ends of the plates 33a, guide holes 37 are provided, and in a space 38 formed between the bases 33b of each plate 33a, a rectangular clamp member 40 having formed on the inside a stepped portion 39, which is like the stepped portion 36, is provided closer to the inside.

In the middle of the clamp member 40, a slit 41 that opens beneath the stepped portion 39, and a screw hole penetrating inside out across the slit 41 are provided. In the screw hole, a clamp screw 43 having a flange 42 is disposed with the flange 42 being put in the slit 41.

The die receiving member 34 incorporates a coupler, not shown, for connecting temperature regulating hoses 44 and the temperature regulating circuit 9 of the insert die half 5. The die receiving member 34 and the pair of upper and lower fixing members 33, 33 are affixed to specified positions inside the stationary platen 31 by bolts 45 inserted from outside the stationary platen 31. The clamp screw 43 is integrally coupled with a clamp shaft 46 which is rotatably penetrating in the stationary platen 31, by fitting of the screw shaft end 43a, so that the clamp screw 43 may be rotated by a spanner or the like from the outside of the stationary platen 31 through the clamp shaft 46.

To mount the insert die half 5 in this embodiment, the insert die half 5 is set on one open side of the installation space 35 from the side of the stationary platen 31, and the upper and lower edges of the fixing plate 8 projecting from the main body of the insert die half 5 are fitted beneath the stepped portion 36 of the opposing upper and lower fixing members 33, 33. The insert die half 5 is guided by the fixing members 33, 33, and can be directly pushed in sidewardly until the insertion side edge contacts with the die receiving member 34, and thereby the middle of the upper and lower edges of the fixing plate 8 are positioned beneath the stepped portion 39 of the clamp member 40. When the clamp shaft 46 is turned by the spanner in this state, the clamp screw 43 rotates, and the clamp member 40 is drawn inwardly toward the stationary platen 31 side, and the edges interposed therebetween are drawn toward the inside of the stationary platen 31 by the stepped portion 39 and are fixed thereto.

This fixing is done after positioning the insert die half 5. The positioning is achieved by first mounting the insert die half 6 of the movable platen 32 side, and advancing the movable platen 32 to join both the insert die halves 5, 6 by buckling. The insert die half 5 is only joined to the fixing members 33 and clamp members 40 in a free, movable state although in a limited range. Therefore, if there is a slight deviation in position the insert die half 5 is pushed and moved when joining with the insert die half 6 fixed in the movable platen 32 so as to settle in an adequate fitting position.

As a result, correction of position of the insert die half 5 is done automatically, and after joining the insert die halves together, when the clamp shafts 46 are turned, fixing of appropriate position of the insert die half 5 may be done easily by the clamp members 40.

Mounting of the insert die half 6 to the inside of the movable platen 32 is done similarly to the stationary platen 31 side, by putting the insert die half 6 into an installation space 51 formed inside the movable platen 32, by means of a pair of upper and lower fixing members 50, 50 affixed to the inside of the movable platen 32, and a vertically long die receiving member (not shown) affixed vertically. What differs from the stationary platen 31 side is that the fixing members 50 are of block form and do not possess stepped portions inside, that guide pins 52 to settle in the guide holes 37 project at both ends, and that a positioning block 53 is provided at the open side of the installation space 51. Mounting of the insert die half 6 is achieved by fitting into the installation space 51 from the front side of the movable platen 32 by projecting the sleeve 25 accommodating the punch 24 and others on the back side of the insert die half 6, and the lateral position of the insert die half 6 is corrected by turning to increase or decrease the projecting length of a set screw 54 provided in the positioning block 53.

As for the insert die half 6 of the movable platen 32 side, when the formed product is an information recording disk such as a CD, MD, CD-ROM, CDR, and MO having data written only on one side, the stamper 21 is required only on the insert die half 5 of the stationary platen 31 side, and as far as the disks of the same standard are formed, it is not necessary to attach or detach the insert die half 6 of the movable side 32, and only the insert die half 5 of the stationary platen 31 side possessing the stamper 21 is replaced in every forming of product differing in the written data.

The replacement of the insert die half 5 is effected easily by pushing in the insert die half 5 between the upper and lower fixing members 33, 33 from the side of the stationary platen 31, or drawing it out, and moreover the insert die half 5 can be fixed by the clamp member 40 from outside the stationary platen 31 after correcting the position by buckling, so that the positioning precision is high, and if the insert die half 5 is replaced frequently for small production of multiple types, the replacement does not require labor, an it can be done in a short time.

Reference numeral 55 denotes a tie bar, and 56 shows a handle for fitting the insert die half 5.

As is apparent from the above description, according to the present invention, a die assembly for molding a disc by employing an injection molding process is constructed of a stationary die half and a movable die half wherein the stationary die half comprises a stationary platen, a base die half and an insert die half, while the movable die half comprises a movable base die half and an insert die half. In addition, the insert die half on the stationary platen side has a cavity formed therein in which a mirror surface board is fixedly received together with a stamper. With such construction, die replacement can easily be accomplished merely by detaching the stamper or an assembly of the stamper and the mirror surface board from the insert die half on the stationary platen side and then attaching a new stamper or a new assembly of the stamper and mirror surface board to the insert die half.

In addition, since the stationary die half has temperature regulating circuits incorporated therein so as to enable the mirror surface board to be previously heated to a predetermined temperature which is suitable for performing each molding operation, a temperature regulating operation can be stably and efficiently performed for the mirror surface board on the insert die half on the stationary platen side with the result that a molded disc product such as an optical disc having excellent transferability or the like can be produced while an occurrence of double refraction is substantially suppressed.

Additionally, since the mirror surface board is fixedly received in the insert die half on the stationary platen side, the whole mass of the stationary die half is increased, enabling an undesirable temperature influence induced due to heat radiation during die replacement to be substantially reduced. Thus, a molding operation can smoothly be restarted after completion of the die replacement. Further, since die temperature regulation can be achieved also at a location outside the molding machine with the aid of temperature regulating circuits formed in the insert die half on the stationary platen side, the temperature of a new mirror surface board to be replaced with the present one can previously be regulated at the foregoing location. Consequently, the present die temperature can reliably be restored to a predetermined temperature within a short period of time after completion of the die replacement. Subsequently, a molding operation can be repeated stably.

As is well known by any expert in the art, a mirror surface has high resin adhesiveness compared with a stamper surface. Thus, in a case where a stamper is arranged on the stationary platen side, there is recognized a marked tendency that when the die assembly is opened after completion of a molding operation, a molded disc product is pulled toward the movable die half side due to a difference between resin adhesiveness of the mirror surface and resin adhesiveness of the stamper surface as the movable die half is parted away from the stationary die half. The foregoing tendency assures that a molded disc product molded with the stamper surface reversely transferred thereto can easily be separated away from the stamper without any possibility that the disc remains on the stationary platen side after completion of each molding operation.

Since the molded disc product is parted away from the stamper at the same time when the die assembly is opened, it is uniformly cooled on the movable die half while it is exposed to the outside. In contrast with the conventional die assembly, the foregoing uniform cooling prevents the disc from being undesirably warped due to a difference of thermal contraction from location to location on the movable die half attributable to irregular cooling. Consequently, a molded disc product having excellent transferability can be produced with the die assembly of the present invention.

While the present invention has been described above with respect to preferred embodiments thereof, it should of course be understood that the present invention should not be limited only to these embodiments but various changes or modifications may be made without departure from the scope of the present invention as defined by the appended claims.

What is claimed is:

1. A die assembly for molding a disc wherein die replacement can be achieved at a location away from the die assembly, the die assembly comprising:

a) a stationary die half, comprising:
   1) a stationary platen;
   2) a base die half on the stationary platen, an installation space between the stationary platen and the base die half;
   3) a pair of retaining members in the installation space, each retaining member comprising:
      (A) a fixing member extending longitudinally in a transverse direction with respect to the stationary platen, a space between the fixing member and the stationary platen,
      (B) spring members between the fixing member and the stationary platen, and
      (C) a wedge member between the base die half and the fixing member;
   4) a die receiving member at one side of the stationary platen and extending longitudinally in a vertical direction thereof; and
   5) a first insert die half removably retained in the installation space by the retaining members and the die receiving member, the first insert die half comprising:
      (i) a first insert having a cavity formed therein and a stepped portion, and
      (ii) a first mirror surface board removably received in said cavity of said first insert, said first mirror surface board including a stamper placed on a surface of said first mirror surface board, an inner ring fitted through said first mirror surface board and an outer ring fitted onto said first mirror surface board, said stamper being immovably retained by said inner ring and said outer ring, and a rear surface of said outer ring being fitted onto said stepped portion of said first insert,

11 wherein said first insert die half can be slidably installed into and removed from said installation space in a transverse direction relative to said stationary platen such that replacement of said first mirror surface board and said stamper can be achieved at a location spaced away from the die assembly, the first insert of the first insert die half being slidable in the spaces between the fixing members and the stationary platen, said first insert being fixed by said fixing members pushed by the associated wedge members so that said fixing members compress the associated spring members toward the stationary platen, thereby removably retaining the first insert die half in the installation space; and b) a movable die half, comprising:
1) a movable base that forms a main body of said movable die half, said movable base having a recessed portion; and
2) a second insert die half comprising (i) a second insert fixedly received into said recessed portion of said movable base; and (ii) a second mirror surface board received on said second insert so as to correspond to said first mirror surface board on said first insert.

2. A die assembly for molding a disc wherein die replacement can be achieved at a location away from the die assembly, the die assembly comprising:

a) a stationary die half, comprising:
1) a stationary platen;
2) a pair of retaining members on an inner side of the stationary platen, each retaining member comprising:
(A) a fixing member extending longitudinally in a transverse direction with respect to the stationary platen, and
(B) a rectangular clamp member, a clamp screw associated with the clamp member and rotatable from an outer side of the stationary platen for moving the clamp member toward and away from the inner side of the stationary platen;
3) a die receiving member at one side of the stationary platen and extending longitudinally in a vertical direction thereof, whereby an installation space is defined at the inner side of the stationary platen by said retaining members and said die receiving member; and 4) a first insert die half removably retained in the installation space by the retaining members and the die receiving member, the first insert die half comprising:
(i) a first insert having a cavity formed therein and a stepped portion, and
(ii) a first mirror surface board removably received in said cavity of said first insert, said first mirror surface board including a stamper placed on a surface of said first mirror surface board, an inner ring fitted through said first mirror surface board and an outer ring fitted onto said first mirror surface board, said stamper being immovably retained by said inner ring and said outer ring, and a rear surface of said outer ring being fitted onto said stepped portion of said first insert, wherein said first insert die half can be slidably installed into and removed from said installation space in a transverse direction relative to said stationary platen such that replacement of said first mirror surface board

12 and said stamper can be achieved at a location spaced away from the die assembly, said fixing member comprising a pair of block-shaped bases and a laterally extending long plate, the bases being integrally formed at respective rear sides of both ends of said long plate, respective inside portions of the bases having stepped portions for receiving the first insert of the first insert die half, the rectangular clamp member being positioned at an inner side of the long plate in a space between the bases, an inner side of the rectangular clamp having a stepped portion that is aligned with the above-mentioned stepped portions of the bases, and said first insert die half is fixed to the stationary platen by inserting said first insert die half guided by said fixing members into a space between the stepped portions of the fixing members and the clamp member and the inner side of the stationary platen, and by moving the clamp member toward the stationary platen inner side by turning the clamp screw, thereby removably retaining the first insert die half in the installation space; and b) a movable die half, comprising:
1) a movable base that forms a main body of said movable die half, said movable base having a recessed portion; and
2) a second insert die half comprising (i) a second insert fixedly received into said recessed portion of said movable base; and (ii) a second mirror surface board received on said second insert so as to correspond to said first mirror surface board on said first insert.

3. A die assembly for molding a disc of claim 2, wherein the clamp member includes a slit located beneath the stepped portion, and a screw hole extending across the slit, and the clamp screw having a flange, the clamp screw in the screw hole with the flange in the slit, the clamp screw is integrally coupled with a rotatable clamp shaft passing through the stationary platen so as to be rotatable from the outer side of the stationary platen through the clamp shaft.

4. A die assembly for molding a disc of claim 2, wherein the fixing members include guide holes for receiving corresponding guide pins projecting from the movable die half.

5. A die assembly for molding a disc wherein die replacement can be achieved at a location away from the die assembly, the die assembly comprising:

a) a stationary die half including:
1) a stationary platen, at an inner side of the stationary platen:
A) retaining members, each retaining member comprising:
(i) a fixing member extending longitudinally in a transverse direction with respect to the stationary platen, and
(ii) a clamp member and screw means associated with the clamp member to be operable from an outer side of the stationary platen for moving the clamp member toward and away from the inner side of the stationary platen, and
B) a die receiving member;
2) a first insert die half removably retained at the inner side of the stationary platen by the retaining members and the die receiving member, the first insert die half comprising:
A) a first insert having a cavity formed therein and a stepped portion, and B) a first mirror surface board removably received in said cavity of said first insert, said first mirror surface board including a stamper placed on a surface of said first mirror surface board, an inner ring fitted through said first mirror surface board and an outer ring fitted onto said first mirror surface board, said stamper being immovably retained by said inner ring and said outer ring, and a rear surface of said outer ring being fitted onto said stepped portion of said first insert, wherein said first insert die half is removable from said stationary platen such that replacement of said first mirror surface board and said stamper can be achieved at a location spaced away from the die assembly, said fixing member comprising a pair of bases and a plate, the bases being attached at respective rear sides of both ends of said plate, respective inside portions of the bases including means for receiving the first insert of the first insert die half, the clamp member being positioned at an inner side of the plate in a space between the bases, an inner side of the clamp member having means for receiving the first insert of the first insert die half, and said first insert die half is fixed to the stationary platen by inserting said first insert die half guided by said fixing members into a space between the inner side of the stationary platen and the means for receiving the first insert of the fixing members and the clamp member, and by moving the clamp member toward the stationary platen inner side by operation of the screw means, thereby removably retaining the first insert die half on the stationary platen; and b) a movable die half, comprising:
1) a movable base that forms a main body of said movable die half, said movable base having a recessed portion;
2) a second insert die half comprising (i) a second insert fixedly received into said recessed portion of said movable base; and (ii) a second mirror surface board received on said second insert so as to correspond to said first mirror surface board on said first insert.

6. The die assembly as claimed in claim 5, wherein said fixing members are structured and arranged so that said first insert can be slidably inserted in said fixing members in a transverse direction relative to said stationary platen so as to be retained on said stationary platen, and can be slidably removed from said fixing members for replacement of said first mirror surface board and said stamper.

* * * * *